E. F. SMITH.
ABRADING SURFACE.
APPLICATION FILED APR. 25, 1907. RENEWED AUG. 9, 1910.
973,986. Patented Oct. 25, 1910.
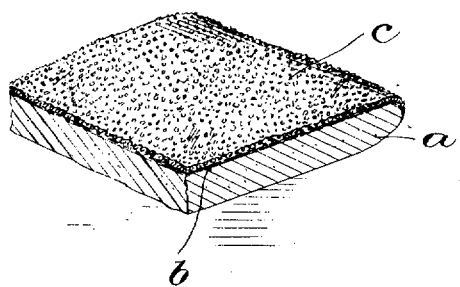
Witnesses
W. A. Williams
C. P. Wright, Jr.
Inventor
Edward F. Smith.
By A. S. Pattison
Attorney ial is weak. Some of the substances, such

UNITED STATES PATENT OFFICE.

EDWARD F. SMITH, OF ROCHESTER, NEW YORK.

ABRADING-SURFACE.

973,986. Specification of Letters Patent. Patented Oct. 25, 1910.

Application filed April 25, 1907, Serial No. 370,302. Renewed August 9, 1910. Serial No. 576,391.

*To all whom it may concern:*

Be it known that I, EDWARD F. SMITH, a citizen of the United States, residing at Rochester, in the county of Monroe and State of New York, have invented certain new and useful Improvements in Abrading-Surfaces, of which the following is a specification, reference being had therein to the accompanying drawing.

This invention relates to an improved abrading surface, and is more particularly intended for use in implements or machines used for peeling or grating vegetables, etc., though it is adapted for and capable of being used for grinding or polishing purposes of various kinds.

I am aware that abrading surfaces have heretofore been produced in which a metal is used as a base to which the abrading material has been attached by various substances, such as japan, shellac, gum, sulfur, enamel, and other similar substances. Some of these adhesive substances are affected by moisture and are therefore objectionable, and their attachment of the abrading material is weak. Some of the substances, such as the enamel, and those that are similar thereto, are found in practice to be open to the objection that any imperfect cleaning of the metal base to be coated will make a weak adhesive of the enamel, or similar material, even when fused under the ordinary process of fusing enamel to metals, or else such coatings being thin, often become cracked and separate from the metal by reason of a blow or knock. In this instance, the enamel or other substance used to attach the abrading material to the metal base, is even after the fusing process, a layer upon and separate from the metal, due principally from the fact that the metal is non-porous (so far as the fusing process is concerned) with the result that as stated, the finished product is a metallic base with an adhesive substance practically separate from the metal. In the case of those adhesives which are affected by moisture, the abrading material is not adapted to be used upon wet or moist substances, and are even affected by the moisture from the atmosphere which penetrates between the adhesive and the metal, and causes the abrasive surface to blister and separate from the metal.

The object of my invention is to produce an abrasive surface not subject to the above mentioned objections, and this I accomplish by using a base and an adhesive substance which will, under the ordinary fusing process, fuse together into substantially one homogeneous mass, whereby the abradant material, which is embedded into the adhesive, is firmly attached to the base, and is not subject to the objections heretofore mentioned, which arise where the base and the adhesive material in the resultant product are in substantially separate layers.

The accompanying drawing is a perspective sectional view of an abrading surface embodying my invention.

My present invention consists in forming a base *a* from earthenware, such as stoneware, or other clay products, which are in their unglazed condition, of a marked porous nature, and to attach the abrasive material *b* to this base of earthenware or clay product by a suitable adhesive *c*. Owing to the porous nature of the clay product base, the adhesive in the fusing process enters intimately into the pores of the base, so that the adhesive, which carries the abrading material, (such as flint, carborundum, or other abrasive substance) is so permanently attached as not to be open to the objections heretofore noted. Furthermore, owing to the nature of the clay product, it is not necessary that it be clean to the extent and carefulness that is required when a metal base is used.

While the base of a clay product is advantageous over a metal base, with any kind of adhesive material for attaching the abrasive, yet a still further improvement is effected, I find, by using an enamel or glaze which are of the same general nature as the stone-ware itself, as they are derived generally from the same clay, feldspar, fluorspar, etc., and therefore when subjected to the application of heat, such as is used generally in glazing such ware, the base, the enamel and the abrasive will fuse into one homogeneous mass.

The preferred enamel or glaze just mentioned is that ordinarily used for the glazing of stone-ware, the basis of which is, clay, feldspar, flourspar, flint, glass, boracic acid, oxids, etc.

In producing the improved abrading product, the base is first cleaned and may be either burned or unburned, and the enamel or glaze then applied thereto, either with or without the use of some intermediate material, such as gum-tragacanth, and the abrasive material then applied, after which the product is subjected to the heat fusing process, the heat varying according to the mixture of the enamel or glaze, and the component parts of the base.

As previously stated, this improved abrading product or surface is especially intended for implements and machines used for grating and peeling vegetables, or other edibles, and its is therefore exceedingly necessary that this sharp abrading substance should not become detached and mixed with the edibles, for reasons so apparent that they need not be specified.

The abrading surface herein described is inexpensive to produce, durable, and has the advantages hereinbefore specified.

Having thus described my invention, what I claim and desire to secure by Letters Patent, is:—

1. An improved abrading implement consisting of a porous base, a plastic fusible adhesive entering the pores of said base and covering its surface, and an abradant mixed in and carried by said adhesive, the adhesive and abradant material united to the porous base by fusion.

2. An improved vegetable abrading surface consisting of an earthenware base, a plastic fusible adhesive and an abradant material mixed together and covering the earthenware base, the mixture permanently attached thereto by fusing the base and adhesive together to prevent the abradant from detaching and mixing with the vegetables.

In testimony whereof I affix my signature in presence of two witnesses.

EDWARD F. SMITH.

Witnesses:
MAX MUNTZ,
CHAS. LITTLE.